(12) United States Patent
Moir et al.

(10) Patent No.: US 8,533,699 B2
(45) Date of Patent: Sep. 10, 2013

(54) SYSTEM AND METHOD FOR OPTIMIZING A CODE SECTION BY FORCING A CODE SECTION TO BE EXECUTED ATOMICALLY

(75) Inventors: Mark S. Moir, Wllington (NZ); David Dice, Foxboro, MA (US); Srikanta N. Tirthapura, Ames, IA (US)

(73) Assignee: Oracle International Corporation, Redwood City, CA (US)

( * ) Notice: Subject to any disclaimer, the term of this patent is extended or adjusted under 35 U.S.C. 154(b) by 318 days.

(21) Appl. No.: 13/077,793

(22) Filed: Mar. 31, 2011

(65) Prior Publication Data
US 2012/0254846 A1 Oct. 4, 2012

(51) Int. Cl.
G06F 9/45 (2006.01)
G06F 9/46 (2006.01)

(52) U.S. Cl.
USPC ............ 717/152; 717/151; 718/101; 718/102

(58) Field of Classification Search
None
See application file for complete search history.

(56) References Cited

U.S. PATENT DOCUMENTS

| | | | |
|---|---|---|---|
| 7,398,355 B1 * | 7/2008 | Moir et al. ..................... | 711/118 |
| 8,095,741 B2 * | 1/2012 | Heller et al. .................. | 711/147 |
| 8,095,750 B2 * | 1/2012 | Heller, Jr. ..................... | 711/156 |
| 8,099,726 B2 * | 1/2012 | Harris ........................... | 717/159 |
| 8,281,185 B2 * | 10/2012 | Nussbaum et al. ............. | 714/15 |
| 8,321,637 B2 * | 11/2012 | Baum et al. ................... | 711/150 |
| 2007/0055960 A1 | 3/2007 | Damron et al. | |
| 2008/0127035 A1 * | 5/2008 | Lev et al. ...................... | 717/100 |
| 2009/0254905 A1 * | 10/2009 | Yip et al. ...................... | 718/101 |
| 2009/0282386 A1 * | 11/2009 | Moir et al. .................... | 717/106 |
| 2009/0282405 A1 * | 11/2009 | Moir et al. .................... | 718/100 |
| 2009/0328018 A1 | 12/2009 | Detlefs et al. | |
| 2010/0169870 A1 | 7/2010 | Dice | |
| 2010/0205408 A1 * | 8/2010 | Chung et al. .................. | 712/216 |
| 2010/0332538 A1 * | 12/2010 | Gray et al. .................... | 707/774 |
| 2011/0099335 A1 * | 4/2011 | Scott et al. .................... | 711/141 |
| 2011/0138135 A1 * | 6/2011 | Dice et al. ..................... | 711/152 |
| 2011/0246993 A1 * | 10/2011 | Moir et al. .................... | 718/101 |
| 2012/0204163 A1 * | 8/2012 | Marathe et al. ............... | 717/151 |

OTHER PUBLICATIONS

M. M. Waliullah, "Schemes to Improve the Efficiency of Hardware Transactional Memory Systems," Division of Computer Engineering Department of Computer Science and Engineering Chalmers University of Technology Göteborg, Sweden 2007.*

(Continued)

Primary Examiner — Insun Kang
(74) Attorney, Agent, or Firm — Robert C. Kowert; Meyertons, Hood, Kivlin, Kowert & Goetzel, P.C.

(57) ABSTRACT

Systems and methods for optimizing code may use transactional memory to optimize one code section by forcing another code section to execute atomically. Application source code may be analyzed to identify instructions in one code section that only need to be executed if there exists the possibility that another code section (e.g., a critical section) could be partially executed or that its results could be affected by interference. In response to identifying such instructions, alternate code may be generated that forces the critical section to be executed as an atomic transaction, e.g., using best-effort hardware transactional memory. This alternate code may replace the original code or may be included in an alternate execution path that can be conditionally selected for execution at runtime. The alternate code may elide the identified instructions (which are rendered unnecessary by the transaction) by removing them, or by including them in the alternate execution path.

20 Claims, 10 Drawing Sheets

(56) References Cited

OTHER PUBLICATIONS

Moir et al., "The Adaptive Transactional Memory Test Platform: A Tool for Experimenting with Transactional Code for Rock," Sun 2007.*

Dice et al., "Early Experience with a Commercial Hardware Transactional Memory Implementation," Sun, ASPLOS'09, Mar. 7-11, 2009, Washington, DC, USA. AC M 978-1-60558-406-5/09/03.*

Michael et al., "Simple, Fast, and Practical Non-Blocking and Blocking Concurrent Queue Algorithms," ACM Symposium on Principles of Distributed Computing, 1996, 9 pages.*

Early Experience with a Commercial Hardware Transactional Memory Implementation. Dave Dice, Yossi Lev, Mark Moir and Dan Nussbaum. ASPLOS, 2009, 12 pages.

Simple, Fast, and Practical Non-Blocking and Blocking Concurrent Queue Algorithms. M. M. Michael and M. L. Scott. ACM Symposium on Principles of Distributed Computing, 1996, 9 pages.

The Adaptive Transactional Memory Test Platform: A Tool for Experimenting with Transactional Code for Rock, Dave Dice, Maurice Herlihy, Doug Lea, Yossi Lev, Victor Luchangco, Wayne Mesard, Mark Moir, Kevin Moore and Dan Nussbaum. Transact workshop, 2008, 10 pages.

* cited by examiner

SYSTEM AND METHOD FOR OPTIMIZING A CODE SECTION BY FORCING A CODE SECTION TO BE EXECUTED ATOMICALLY

BACKGROUND

Description of the Related Art

Transactional memory is a promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, relieving programmers of at least some of the complexity, tradeoffs, and software engineering problems typically associated with concurrent programming and execution. Transactional memory may be implemented in hardware, in software, or in a combination of the two, in various embodiments.

Transactional memory (TM) implementations may provide programmers with the ability to mark blocks of code as transactions, and the system may ensure that the code is executed atomically and in isolation from concurrently executing transactions. When a region of code is so designated, it should appear as if the section is executed in its entirety or not at all, and it should appear as if the executions of concurrently executing atomic blocks are not interleaved with each other. Typical TM implementations execute atomic blocks of code as "optimistic" transactions, meaning that, rather than preventing concurrent execution, they proceed with the hope that no interference occurs, and have the capability to confirm that this is the case, rolling back the transaction and retrying it in the case that there is interference.

SUMMARY

The systems and methods described herein for optimizing code may use transactional memory to optimize one code section by forcing another code section to execute as an atomic transaction. For example, the source code of an application may be analyzed to identify a sequence of instructions in one code section that only needs to be executed if there exists the possibility that another code section (e.g., a critical section) could be partially executed, or that its results (e.g., with respect to accesses to a shared data structure or other shared resource) could be incorrect due to interference by another process or thread. For example, the identified sequence of instructions may, when executed, perform one or more bookkeeping operations that facilitate detecting an incorrect or otherwise unexpected result of the critical section with respect to one or more access operations that target a shared resource (e.g., recording information that can be subsequently used to detect an inconsistency between the value of the shared resource that is visible to one executing thread and the value of the shared resource that is visible to another executing thread), or that facilitate detecting another unexpected condition caused by interference from another thread. In another example, the identified sequence of instructions may, when executed, perform one or more operations that facilitate recovering from a failure to complete the critical section in its entirety or from interference with the access operations that target the shared resource by instructions of another process or thread whose execution is interleaved with the execution of the critical section. For example, in some embodiments, the identified sequence of instructions may, when executed, record information usable to identify a thread or process that will perform the other code section (e.g., the critical section), such as a thread or process ID, an encoding representing or associated with a thread or process, or information that is usable to identify a thread or process through one or more levels of indirection.

In response to identifying such instructions, alternate code may be generated that forces the critical section to be executed as an atomic transaction, e.g., using best-effort hardware transactional memory. This alternate code may replace the original code or may be included in an alternate execution path that can be conditionally selected (e.g., through the evaluation of one or more branch conditions) for execution at runtime, in different embodiments. In some embodiments, the system may be configured to determine (e.g., at runtime) whether attempting to execute the critical section using a hardware transactional memory implementation is likely to be successful (e.g., based on past performance or other collected statistics), and if so, to select the alternate execution path for executing the critical section. In other embodiments, such a determination may be made statically for a given critical section (e.g., when the alternate code is developed, or at compile time).

The alternate code may elide at least a portion of the identified instructions (e.g., instructions that are rendered unnecessary by the use of an atomic transaction to execute the critical section) by removing them, or by including them in the alternate execution path. In some embodiments, the identified sequence of instructions (which may be optimized or elided using the techniques described herein) may be a subset of the critical section itself. In other embodiments, the identified sequence of instructions may be a prologue to be executed prior to executing the critical section or an epilogue to be executed subsequent to executing the critical section. For example, a prologue may perform bookkeeping operations associated with accesses to a shared resource by instructions within the critical section. An epilogue may perform operations to update at least some of the bookkeeping associated with accesses to the shared resource, and/or may perform operations that facilitate detecting or recovering from interference with accesses to the shared resource by a third sequence of instructions (e.g., another process or thread) whose execution may be interleaved with the execution of the critical section, or for recovering from a partial execution of the critical section.

In some embodiments, if one or more attempts to execute the critical section using a hardware transaction fail, the system may be configured to attempt to execute the critical section using a software transaction, or using the operations specified in the source code (including the critical section and the identified sequence of instructions). In some embodiments, at least some of the analyzing of the source code, the identifying of the sequence of instructions that may in some cases be elided, and/or the generation of the alternate code may be performed by (or with the assistance of) a compiler, a code optimizer, an assembler, a just-in-time (JIT) compiler, a dynamic compiler, or any of various other profiling, debugging, code editing, and/or optimization tools of a software development platform.

Figure 1:
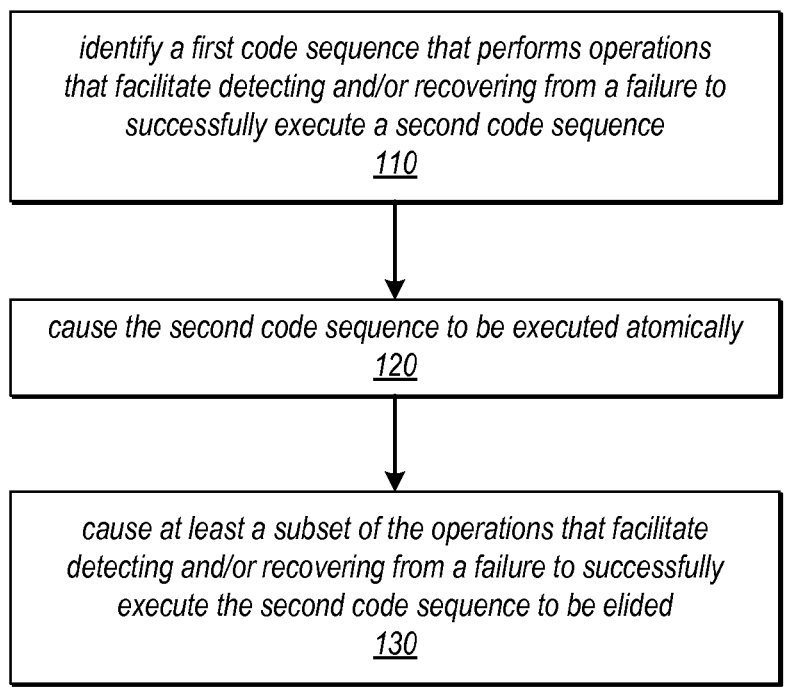
FIG. 1 is a flow diagram illustrating one embodiment of a method for optimizing one code sequence by causing another code sequence to be executed atomically, as described herein.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, transactional memory is a promising concurrency control technology for parallel programming in the new multi-core era of computing. In some embodiments, the systems and methods described herein may use transactional memory to improve the performance of one or more sections of code by executing a related (or possibly the same) section of code atomically, e.g., using a hardware transaction. For example, the techniques described herein may improve performance in situations in which one code section (e.g., a section A) is needed only because of the possibility that steps taken in code in another section (e.g., a section B) may be interleaved with steps of other processes or threads and/or the code in section A may be only partially executed. In some embodiments, the steps in such a section B may be executed atomically, thereby preventing the possibility of its operations being interleaved with those of other threads. Thus, the code in the related section A may be elided or otherwise optimized. Note that in several examples described herein, it may be assumed that code sections A and B are both executed by the same thread. However, in other embodiments, code sections A and B may be executed by different threads.

In some embodiments, the systems described herein may be configured to identify a section of code that includes operations that are required only to deal with the possibility that execution of another section of code (e.g., one that accesses a shared resource) may be interleaved with the execution of other processes or threads (e.g., other processes or threads that also access the shared resource) or the code may not be executed in its entirety. In some of the examples described herein, the identified section of code may be referred to as "companion code" associated with the other section of code (e.g., the code that accesses the shared resource). In response to identifying such companion code, the systems described herein may be configured to force the section of code that accesses the shared resource to be executed atomically (e.g., using a hardware transaction). In some embodiments, a compiler implemented in the system may be configured to analyze source code to identify such companion code, and to generate alternate code that forces the associated section of code to be executed atomically. In other embodiments, an exercise to analyze source code, to identify such companion code, and to generate alternate code may be performed by the programmer with the assistance of a compiler (or a code optimizer, an assembler, a just-in-time compiler, or a dynamic compiler) and/or other profiling, debugging, code editing, or optimization tools of a software development environment. By forcing the section of code that accesses the shared resource to be executed atomically, it may be possible to optimize the identified companion code (e.g., using a compiler, a code optimizer, or other tools), since the operations that were included in the companion code only to deal with the possibility of interference or partial execution may no longer be required. Examples of the use of these techniques are described herein, including several examples that involve latches, such as those employed in various database systems.

One embodiment of a method for optimizing one code sequence by forcing another code sequence to execute atomically is illustrated by the flow diagram in FIG. 1. As illustrated as 110, in this example, the method includes identifying a first code sequence that (when executed) performs operations that facilitate detecting and/or recovering from a failure to successfully execute a second code sequence in its entirety. For example, the first code sequence may include companion code that is only needed in the case that the second code sequence could be partially (but not completely) executed, or in the case that the execution of the second code sequence is interleaved with the execution of another concurrently executing code sequence that accesses one or more of the same variables or memory locations, which interferes with its results.

As illustrated at 120, the method may include causing the second code sequence to be executed atomically. Various mechanisms for causing the second code sequence to be executed atomically are described in more detail herein. By using these, or any other suitable mechanisms, to force the second code sequence to execute atomically, the possibility of interference or partial execution may be removed. When an attempt is made to execute the second code sequence atomically, the result will be as if it executed completely or not at all. Therefore, at least a subset of the operations in the first code sequence (e.g., various operations that facilitate detecting and/or recovering from a failure to successfully execute the second code sequence in its entirety) may be elided, as in 130. Note that in some embodiments, the system may be configured to initiate multiple attempts to execute the second code sequence atomically if a first attempt is unsuccessful. However, even in these cases, there may not be any possibility of interference from other processes/threads or partial execution of the second code sequence.

The techniques described above may be further illustrated using the following concrete examples. In a first example, these techniques are applied in the specific context of a latch in a database system. In this example, the term "latch" refers to a low-level concurrency primitive (i.e. a lock) in the database implementation that is intended to be held for short periods of time. When many latches are used in a system, the possibility of deadlock must be considered. Although lock-ordering techniques may be used in some systems to avoid deadlock in many cases, deadlock may still arise due to hold-and-wait cycles involving different kinds of resources. Therefore, a database implementation may not entirely avoid deadlock, and may instead arrange for such deadlock to be detected and resolved should it occur.

In a typical database system that employs such latches, if a process dies while holding a latch, other processes must be able to detect the process death, and clean up after the dead process in order to allow the rest of the system to continue to operate. In some such systems, to facilitate deadlock detection, and to allow the partial effects of a section of code executed while holding a latch to be cleaned up during recovery after a process death, certain information may be recorded before each time a latch is acquired, and may be cleaned up after the latch is released.

In some embodiments of the techniques described herein, one section of code (e.g., a critical section of code protected by a database latch) may be forced to execute atomically, (e.g., using a hardware transaction), thereby enabling optimization of another section of code that performs bookkeeping and/or recovery operations associated with the latch.

Note that the techniques described herein may reduce overhead associated with executing critical sections of code. In some embodiments, for a critical section of code that is forced to execute atomically, code that includes instructions to read an associated latch and check that it is not held may be inserted within the transactional scope, rather than requiring the latch to be acquired and then released. This may in some embodiments allow concurrent execution of critical sections that are protected by the same lock. However, even if this is never the case, doing so may avoid modifying the latch (thereby reducing memory coherence traffic), and may also reduce the number of store operations performed within each transaction. Reducing the number of store operations performed within a transaction may be advantageous when using a best-effort hardware transactional memory feature to execute the critical section, e.g., if the best-effort hardware transactional memory implementation can support only a limited number of store operations within any successful transaction.

In the example above, for each latch, statistics may be maintained, such as the number of times a latch was acquired, the number of times the latch was acquired without the thread having to wait, or the average time spent waiting for the latch. In some embodiments, some such statistics may need to be updated each time the latch is acquired or released, even when the code that would normally be protected by the latch is forced to execute atomically. In other embodiments, it may be possible to elide the updating of some or all such statistics when the code that would normally be protected by the latch is forced to execute atomically.

In this and other examples described herein, the companion code executed before acquiring a latch may be referred to as the "prologue" and the companion code executed after the latch is released may be referred to as the "epilogue". In this and other examples described herein, the code executed while holding the latch may be referred to as the "critical section" of code.

In some embodiments, if the critical section is forced to execute within an atomic transaction (e.g., a hardware transaction), then it executes in its entirety or not at all. Therefore, there may be no risk of a deadlock occurring as a result of acquiring the latch, and (consequently) there may be no need to record information to facilitate deadlock detection. Furthermore, because the critical section will be executed entirely or not at all (as is guaranteed when using a hardware transaction), even if a process dies during its execution, there may be no need to facilitate cleanup of the results of a partial execution of the critical section. Thus, significant optimizations are possible in this case. For example, not only may prologue code that records information to facilitate deadlock detection and recovery be eliminated or significantly reduced, but also the epilogue code configured to clean up afterward (which may include code configured to update or delete the recorded information) may similarly be reduced or eliminated, in various embodiments. As previously noted, in some embodiments, the updating of some or all of the statistics related to the latch that would normally be performed may not need to be performed if the critical section is executed as an atomic transaction, while in other embodiments, some of these statistics may still need to be updated when the critical section is executed as an atomic transaction.

While a variety of mechanisms may be used to ensure atomicity of a code section when applying the optimization techniques described herein, many of the examples described herein are directed to systems that include a best-effort hardware transactional memory feature. Such best-effort hardware transactional memories may make no guarantees that a particular section of code can be successfully executed in a hardware transaction. Therefore, in general, systems that include these best-effort hardware transactional memories may also include a software transactional memory implementation alternative for performing atomic transactions in the case that a hardware transaction attempt is unsuccessful or is unlikely to be successful. The example system described below includes such an alternative, according to one embodiment. In this system, even if every hardware transaction ever attempted failed, the system would still operate correctly. Note that in some embodiments, the use of a software transactional memory alternative may not result in better performance than executing the original code, complete with its original companion code (e.g., a prologue and/or an epilogue). In such embodiments, instead of executing a critical section using the software transactional memory alternative if an attempt to execute the critical section using a best-effort hardware transaction is unsuccessful, the original code sequence may be executed non-transactionally (e.g., by branching to the original code sequence rather than the alternate code sequence). Persons skilled in the art will appreciate that some of the techniques described herein may be significantly simplified in systems in which a hardware transactional memory feature can be relied upon to complete, and (consequently) in which software alternatives are not needed.

The following examples are directed to a database system that includes a best-effort hardware transactional memory implementation and a software transactional memory alternative, according to one embodiment. In this system, a new hardware transaction may be started using the chkpt instruction, which may specify a PC-relative "fail address". In this system, all the code executed after the chkpt instruction and up until a commit instruction is encountered (i.e. the code sometimes referred to herein as the critical section) is executed atomically (i.e. in its entirety or not at all). If the critical section is executed in its entirety, control continues after the commit instruction. Otherwise (e.g., if the transaction fails), control resumes at the specified fail address, and the code executed within the transaction has no visible effect (except, in some embodiments, that the value of a special transaction-related status register may indicate the reason the transaction failed).

In this example database system, a process may acquire a latch by calling a GetLatch routine (or GetLatchShared when requesting a reader-writer latch in read mode) and may subsequently release it by calling a FreeLatch routine. The GetLatch routine may include code to acquire the latch, and the FreeLatch routine may include code to release it. In addition, GetLatch may include prologue code that records information to facilitate deadlock detection and/or recovery, and FreeLatch may include epilogue code to clean up after a deadlock detection.

In one embodiment, the techniques described herein may be implemented in the example system above as follows. In this example, when applying these techniques, the bulk of the database system code may not be modified at all. Instead, changes required to apply these techniques may be restricted to the routines that are configured to perform the acquisition and release of database latches (i.e. the GetLatch and FreeLatch routines, respectively, in this example). More specifically, these techniques may in some embodiments be implemented in the database system by modifying the implementations of GetLatch and FreeLatch such that the code between them is executed within a hardware transaction, and the prologue and epilogue code are optimized accordingly. For example, for each matching GetLatch-FreeLatch pair, one of two techniques may be used to execute a given critical section, as described below.

A. The first technique is the traditional one: within the GetLatch routine, the prologue code is executed and the latch is acquired. Then, control is returned to the calling code (where the critical section is executed), and, finally, the FreeLatch routine is called. Within the FreeLatch routine, the latch is released, and the epilogue code is executed.

B. When using the second technique, the prologue code is not executed. Instead, a hardware transaction is started. Within the hardware transaction, the latch is read and confirmed to be free, and then control is returned to the calling code, where the critical section is executed and the FreeLatch routine is called. Within the FreeLatch routine, the transaction is committed, but the epilogue code is not executed.

From a correctness standpoint, the choice between these techniques may be arbitrary. As explained above, if a best-effort hardware transactional memory feature is used to execute critical sections, there may be no guarantee that a given hardware transaction will succeed, even if retried repeatedly. Therefore, in some embodiments and in at least some cases, if an attempt to use technique B above fails, it may be necessary to instead use technique A to execute the critical section. Note that because a failed transaction has no visible side effects, in some embodiments technique B may be attempted one or more times (e.g., according to a predetermined maximum number of transaction attempts), and if unsuccessful, the system may then resort to using technique A to execute the critical section. In this way, progress may be assured, even though there may be no guarantee that a particular hardware transaction will succeed.

Figure 2:
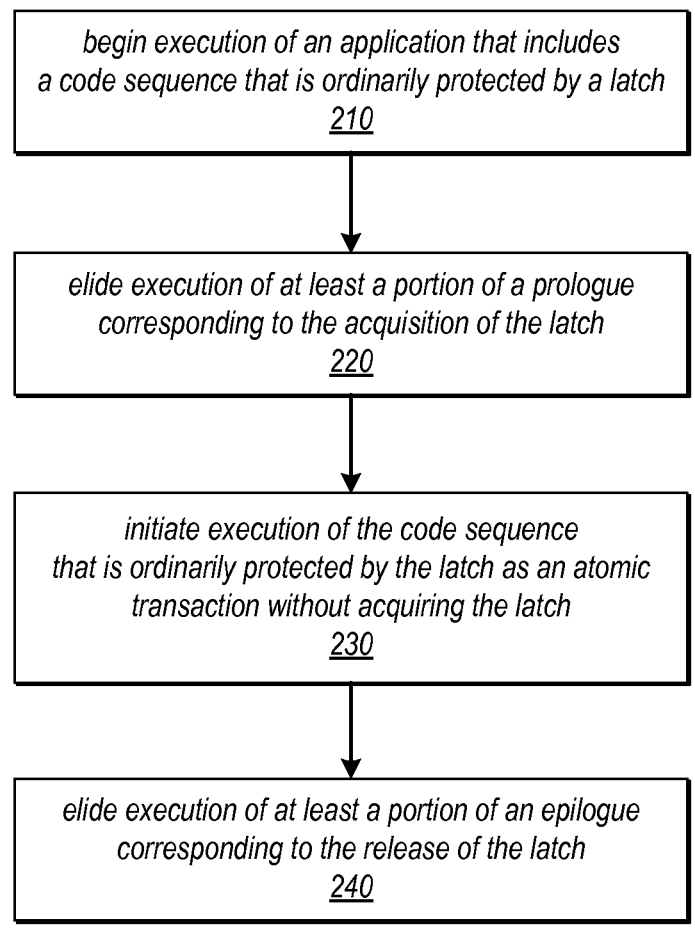
FIG. 2 is a flow diagram illustrating a method for using an atomic transaction to optimize the use of latches, according to one embodiment.

One method for using the techniques described above to elide prologue and/or epilogue code associated with a latch is illustrated by the example flow diagram in FIG. 2, according to one embodiment. In this example, execution may begin for an application that includes a code sequence that would ordinarily be protected by a latch, as in 210. As described above, the application may also include code in a prologue corresponding to (and/or executed prior to) acquisition of the latch. As shown in this example, at least a portion of the prologue may be elided (as in 220) if the code sequence protected by the latch is to be executed as an atomic transaction and without acquiring the latch (as in 230). For example, in some embodiments code that is executable to perform bookkeeping associated with the latch and/or to acquire the latch may not need to be executed. In some embodiments, code that is executable to perform reading the latch and/or determining whether it is available may be inserted into the transactional scope of the atomic transaction in which the critical section is to be executed. As described above, the application may also include code in an epilogue corresponding to (and/or executed subsequent to) the release of the latch. As shown in this example, since the code sequence protected by the latch was executed as an atomic transaction (as in 230), at least a portion of the epilogue may be elided (as in 240). For example, since there is no possibility of interference or partial execution, epilogue code that is executable to clean up after detection of such events may not need to be executed. In addition, in embodiments in which the latch was not acquired (e.g., in a prologue), code that is executable to release the latch may not need to be executed. Instead, the system may rely on the transactional memory implementation (and the fact that the latch was included in the transactional scope of the critical section) to ensure that the critical section executes in isolation and in its entirety, or that its results are not visible at all.

Whether performance benefits are obtained by using the technique described herein may depend on various factors, in different embodiments. For example, for a system (or an application) in which hardware transactions frequently fail and must be retried, (eventually being abandoned in favor of a software alternative), the time spent attempting these failed transactions may be largely wasted, and these techniques may offer little benefit. In such embodiments, even if a given transaction eventually succeeds, if too many retries were required, the time spent on them may outweigh the benefit of optimizing or eliminating the prologue and/or epilogue code. Furthermore, for a system (or an application) in which transactions generally succeed on their first attempt, the overhead of executing code in a transaction may need to be (on average) significantly less than the overhead eliminated from the prologue and/or epilogue code for these techniques to be worthwhile.

In some embodiments, the cost of executing a critical section of an uncontended lock inside a hardware transaction may be comparable to the overhead of acquiring the lock, executing the code, and releasing the lock. In some embodiments, there may be little additional overhead associated with executing additional code within a successful transaction. Therefore, the techniques may be clearly beneficial in at least the embodiments in which transactions usually succeed on the first attempt. In some embodiments, even when multiple attempts may be required to execute a critical section inside a hardware transaction, earlier failed attempts may improve the performance of a later successful attempt due to various side effects of the failed attempts, such as warming caches, TLBs, and/or branch predictors.

Figure 3:
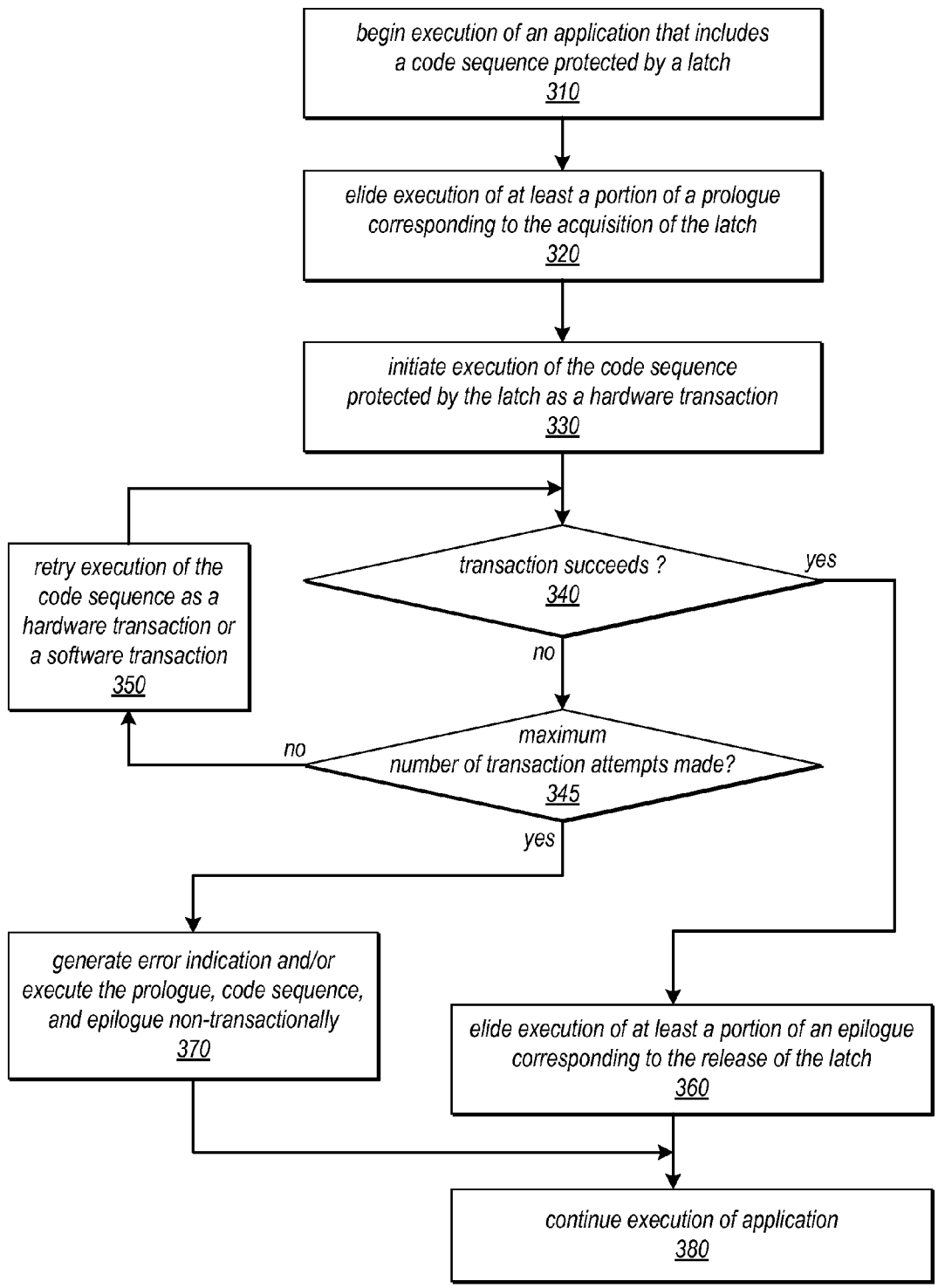
FIG. 3 is a flow diagram illustrating a method for using a best-effort hardware transaction to optimize the use of latches, according to one embodiment.

One embodiment of a method for optimizing one or more code sequences that perform bookkeeping and/or recovery operations associated with a latch by executing a code sequence that is protected by the latch using a best-effort hardware transaction is illustrated by the flow diagram in FIG. 3. As in other examples described herein, a code sequence sometimes referred to as a prologue may include operations for acquiring the latch and/or operations to perform bookkeeping that may be needed to facilitate detection of and/or recovery from a failed attempt to execute the code sequence that would ordinarily be protected by the latch (e.g., due to interference from another concurrently executing code sequence or a failure to complete). In addition, a code sequence referred to as an epilogue may include operations for releasing the latch and/or operations to update at least some of the bookkeeping and/or to facilitate detection of and/or recovery from a failed attempt to execute the code sequence protected by the latch (e.g., dependent on the bookkeeping initiated by the prologue). In this example, execution may begin for an application that includes a code sequence that is protected by a latch, as in 310. As in the example illustrated in FIG. 2, at least a portion of the prologue may be elided (as in 320) if the code sequence protected by the latch is to be executed as an atomic transaction. For example, in some embodiments code that is executable to perform bookkeeping associated with the latch and/or to acquire the latch not need to be executed. In some embodiments, code that is executable to perform reading the latch and/or determining whether it is available may be inserted into the transactional scope of the atomic transaction in which the critical section is to be executed.

In this example, execution of the code sequence protected by a latch may be initiated using a hardware transaction (as in 330). For example, in some embodiments, a best-effort hardware transactional memory feature may be invoked in an attempt to atomically execute the code sequence that would otherwise be protected by the latch. In some embodiments, if the transaction attempt does not succeed (shown as the negative exit from 340), and a maximum number of attempts have not yet been made (shown as the negative exit from 345), the transaction may be retried, as in 350. For example, in some embodiments, a transaction may be retried one or more times until a pre-determined maximum number of attempts have been made. In some embodiments, if the transaction fails when attempted using a best-effort hardware transactional memory, it may be retried using a software transactional memory. Once the transaction succeeds, shown as the positive exit from 340, execution may continue at 360.

As described above, the application may also include code in an epilogue corresponding to (and/or executed subsequent to) the release of the latch. As shown in this example, if the code sequence protected by the latch was executed as an atomic transaction (as in 330), at least a portion of the epilogue may be elided (as in 360), and execution of the application may continue (as in 380). For example, since there is no possibility of interference or partial execution, epilogue code that is executable to clean up after detection of such events may not need to be executed. In addition, in embodiments in which the latch was not acquired, code that is executable to release the latch may not need to be executed. Instead, the system may rely on the transactional memory implementation (and the fact that the latch was included in the transactional scope of the critical section) to ensure that the critical section executes in isolation and in its entirety, or that its results are not visible at all. Note that in the example illustrated in FIG. 3, if a maximum number of transaction attempts have been made, but none were successful (shown as the positive exit from 345), the method may include detecting that the execution of the critical section as an atomic transaction failed and resorting to executing the prologue, the critical section, and the epilogue as in a typical database system and/or generating an error indication (e.g., an indication that execution of the critical section as an atomic transaction failed), as in 370.

In the examples described above, if a hardware (or software) transaction attempt fails, the code it has executed before the failure has no side effects, and control may be transferred to a failure address specified by the chkpt instruction. In some embodiments, this failure address may be within the GetLatch code. In such embodiments, it may be straightforward to initiate the next attempt, using either technique A or technique B described above, from within the GetLatch code. In various embodiments, the determination of the technique to be used for any given attempt to execute a critical section may be made based on a variety of factors, including any feedback about the reason for the failure of a previous hardware transaction attempt (e.g., as indicated in a special transaction-related status register), the number of failed attempts so far, the time spent on failed attempts so far, etc. In some embodiments that employ a best-effort hardware transactional memory feature, the policy about which technique to use may dictate that eventually technique A is selected, so that progress is ensured.

In these examples, the code in FreeLatch may use any of a variety of mechanisms to determine (e.g., at runtime) which technique (i.e. A or B above) was chosen by the GetLatch routine for the current attempt to execute the critical section. For example, in embodiments in which the latch is not acquired when technique B is used, as described above, one approach may be for FreeLatch to test the latch. If the latch is not held, FreeLatch may conclude that technique B is in use, and may simply commit the hardware transaction.

In some embodiments, the latch release code may include an assertion that the current process holds the latch that it is attempting to release. For example, such an assert may be used in order to detect an error condition in which there is a violation of a rule that only the process that acquired a latch is allowed to release it. In such embodiments, an alternative means for determining which technique is in use may be employed. In some such systems, scratch registers may be available for this purpose. For example, a dedicated register or a thread-specific data structure may be used to communicate between GetLatch and the subsequent FreeLatch, e.g., to indicate which technique (i.e. A or B above) is in use. In some embodiments, there may be a context area set aside for each latch. In such embodiments, this context may be used to store state data that describes the technique by which the latch was acquired. Other techniques for determining which technique is in use may be employed in other embodiments and in other contexts. For example, in some embodiments, a hardware transactional memory implementation may provide a mechanism for determining whether a transaction is currently being executed. In such embodiments, this information may be used to determine which technique (i.e. A or B above) is in use.

For ease of exposition, techniques for optimizing code associated with latches have been described above in a context in which prologue and epilogue code associated with a latch can be eliminated entirely if a critical section protected by the latch is successfully executed in an atomic transaction (e.g., a hardware transaction). Persons skilled in the art will appreciate that these techniques may be adapted to contexts in which alternative, optimized versions of prologues and/or epilogue may be used when the critical section is executed within a transaction.

As previously noted, depending on the transactional memory implementation(s) provided in a given system and/or on the code in the critical section itself, some critical sections may be significantly less amenable to execution within hardware transactions than others. When a particular critical section cannot readily be executed within a successful hardware transaction, time spent attempting to do so may be wasted. In some embodiments, this wasted time may reduce the benefit of the techniques described herein, or may even cause performance to deteriorate as compared to systems that do not employ these techniques. Therefore, in some embodiments, it may be beneficial to identify such critical sections and disable the use of these techniques for executing them. Persons skilled in the art will appreciate that a wide variety of approaches are possible, including static and dynamic techniques for disabling (and/or enabling) various techniques for a given latch, a given call site, etc. Some of these approaches are described below, according to various embodiments.

In some embodiments, as an alternative to having GetLatch choose between techniques A and B dynamically, the system may instead implement multiple alternative versions of GetLatch and FreeLatch. For example, in one embodiment, the traditional GetLatch and FreeLatch routines may be augmented with additional routines that have different names (e.g., GetLatch_light and FreeLatch_light), but have the same signature and semantics as GetLatch and FreeLatch, respectively. In this example, GetLatch and FreeLatch may be unmodified from their traditional code (i.e. they may be configured to always apply technique A above), while GetLatch_light and FreeLatch_light may be configured to choose (dynamically, at runtime) between techniques A and B, as described above. In this example, at any given call site, either GetLatch or GetLatch_light may be used, depending on whether the use of these techniques is expected to be beneficial. In such embodiments, the system may be required to use the corresponding release routine (e.g., to use FreeLatch to release a latch acquired using GetLatch, and to use FreeLatch_light to release a latch acquired using GetLatch_light).

Alternatively, if the techniques described herein for optimizing code are expected to be beneficial in most cases, it may be preferable to modify the standard GetLatch and FreeLatch routines to implement these techniques, as described above, and to provide alternative versions (e.g., GetLatch conservative and FreeLatch conservative) that do not attempt to use these techniques, but immediately use the traditional latch techniques. These alternatives may be used for individual call sites that are found (or are expected) not to successfully use the optimization techniques described herein.

In various embodiments that include multiple alternatives for GetLatch and FreeLatch routines, the choice of which alternative to use may be made by the programmer (e.g., guided by profiling data), or by compiler analysis that determines whether a given call site is likely to successfully exploit the optimization techniques described herein. This process may be partially or entirely automated, in some embodiments, e.g., by using profiling data to automatically determine which alternative to use. One approach may use macros that resolve to one of the alternative implementations, with the decision of which one to use being dependent on data collected by profiling the application.

Figure 4:
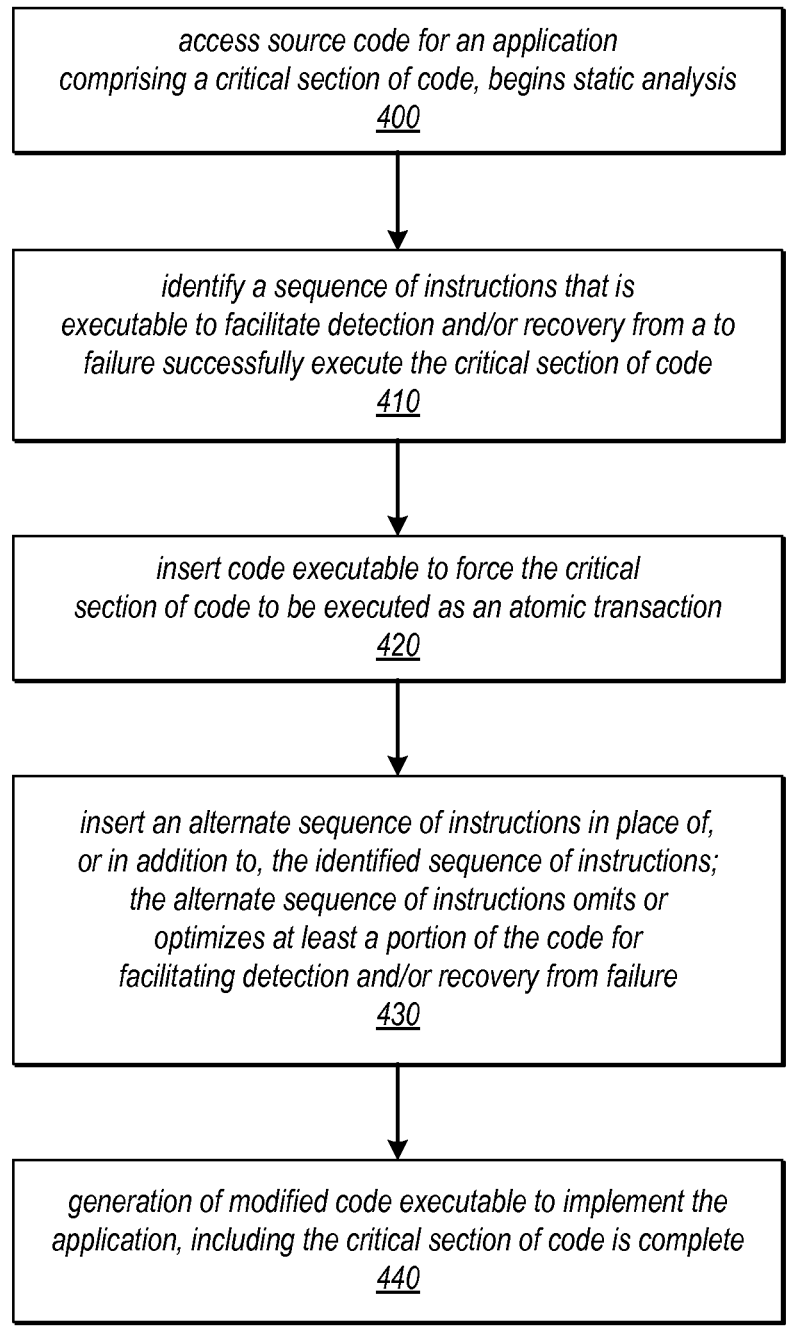
FIG. 4 is a flow diagram illustrating one embodiment of a method for optimizing an identified companion code sequence by causing another code sequence to be executed atomically, as described herein.

One embodiment of a method for optimizing a companion code sequence (e.g., to elide at least a portion of the companion code sequence) by forcing another code sequence to be executed as an atomic transaction is illustrated by the flow diagram in FIG. 4. In this example, source code for an application that includes a critical section of code may be accessed and a static analysis of that code may begin, as in 400. A sequence of instructions may be identified in the source code that is executable to facilitate detection of and/or recovery from a failure to successfully execute the critical section of code in its entirety, as in 410. For example, the identified sequence of instructions may in various embodiments include a prologue or epilogue associated with the critical section (as described above), or any other code that is included in the source code merely because it is possible for the critical section to be partially executed (e.g., bookkeeping or recovery code related to memory locations that are read or modified by the critical section and may need to be returned to their previous state, or other clean-up operations that may need to be performed if a process dies or is otherwise prevented from completing execution of the critical section).

In this example, code may be inserted that is executable to force the critical section to be executed (or at least attempted) as an atomic transaction, as in 420. For example, in various embodiments instructions or language-level constructs may be inserted to bracket the critical section and denote it as a code sequence to be executed as an atomic transaction; calls to functions of a transaction support library to initiate, validate, and/or commit a hardware or software transaction that implements the operations within the critical section (such as the chkpt and commit instructions described herein) may be inserted; loads and stores within the critical section may be replaced with transactional loads and stores; and/or the source code may be otherwise instrumented in a way that would force the critical section to be executed as an atomic transaction.

As illustrated in this example, the method may include inserting an alternate sequence of instructions in place of, or in addition to (e.g., in parallel with), the identified sequence of instructions, as in 430. In embodiments in which an alternate sequence is inserted in parallel with the identified sequence of instructions, only one of the parallel sequences will be selected for execution at runtime. In some embodiments, the alternate sequence of instructions may omit or optimize at least a portion of the code that was identified as being executable to facilitate detecting and/or recovering from a failure to execute the critical section in its entirety. For example, in some embodiments, a prologue, an epilogue, or other bookkeeping or recovery code in the source code of the application may be replaced by alternate code that does not include instructions that would only need to be executed if there exists the possibility that the critical section could be partially executed. In other embodiments, such alternative code may be inserted, but the original prologue, epilogue, bookkeeping code, or recovery code may not be removed. In such embodiments, code that is executable to determine whether to execute the alternate code or the original code at runtime may also be inserted. In this example, generation of modified code executable to implement the application, including the critical section of code may then be complete, as in 440. Note that in some embodiments, the operations illustrated as 410-430 in FIG. 4 may be repeated for any other critical sections and corresponding companion code identified within the source code being analyzed (not shown).

Note that the operations illustrated in FIG. 4 may be performed by a compiler, in some embodiments. In other embodiments, a compiler may first generate executable code from the source code (in its original form) and then may invoke or call an optimizer function, sub-module, or standalone module, which may perform the operations illustrated in 410-430 for each critical section and corresponding companion code section included in the compiled code. In such embodiments, the optimizer may be configured to insert code that is executable to force a critical section to be executed atomically. The optimizer may also be configured to generate alternate code sequences and/or to modify existing code sequences in the compiled code, e.g., to elide bookkeeping and/or recovery code that is not required when a critical section is executed atomically. In general, any or all of the functionally illustrated in FIG. 4 and/or described herein as being performed by a compiler may be performed by a compiler, a code optimizer, an assembler, a just-in-time (JIT) compiler, a dynamic compiler, or any other entity suitable for performing the described functionality. In other embodiments, any or all of the functionally illustrated in FIG. 4 and/or described herein as being performed by a compiler may be performed by the programmer using one or more profiling, debugging, code editing, and/or optimization tools of a software development environment to assist the programmer in analyzing the source code of an application, identifying any companion code within the application, and/or generating modified code for the application, as described herein.

In some embodiments, the choice to enable or disable the optimization techniques described herein may be made more dynamically. For example, in some embodiments single versions of GetLatch and FreeLatch may be used, and these may maintain and use information about the previous success of these techniques (or lack thereof) to decide whether and/or how aggressively to attempt to use them. In some embodiments, per-call-site statistics may be collected to support such decisions. However, in general, the collection and evaluation of such information should not impose excessive overhead. In one embodiment, such overhead may be contained by occasionally sampling success rates, and limiting the overhead of determining the decision based on such data. In embodiments in which GetLatch code is inlined, such decisions may be embodied in self-modifying code, so that there is no overhead for making the decision in the common case.

Figure 5:
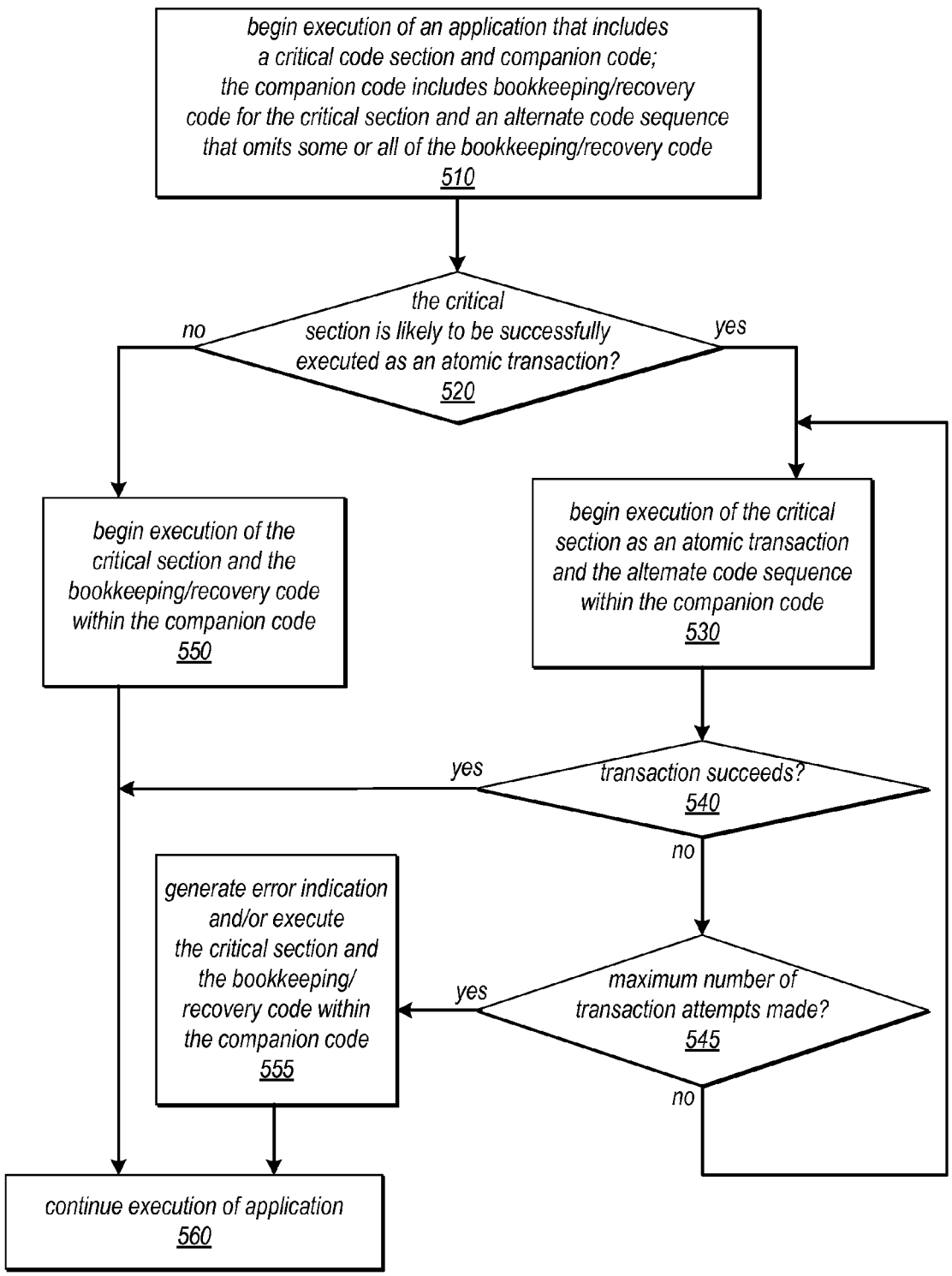
FIG. 5 is a flow diagram illustrating one embodiment of a method for performing dynamic selection of an alternate code sequence that causes another code sequence to be executed atomically and elides at least a portion of a companion code sequence, as described herein.

FIG. 5 is a flow diagram illustrating one embodiment of a method for performing dynamic selection of an alternate code sequence that causes another code sequence to be executed atomically and elides at least a portion of a companion code sequence, as described herein. More specifically, this flow diagram illustrates a method for determining, at runtime, whether to execute or elide prologue, epilogue, bookkeeping code, or recovery code that would only need to be executed if there exists the possibility that the critical section could be partially executed. As illustrated at 510 in this example, the method may include beginning execution of an application that includes a critical section of code, and corresponding companion code. The companion code may in various embodiments include a prologue and epilogue for the critical section and/or other bookkeeping/recovery code for the critical section (as described above), and an alternate code sequence that omits some or all of the prologue/epilogue and/or bookkeeping/recovery code (e.g., alternate code that was generated by the programmer or by a compiler in response to identifying prologue/epilogue and/or bookkeeping/recovery code that would only need to be executed if there exists the possibility that the critical section could be partially executed). Note that in some embodiments, the application, critical section, and/or companion code may be instrumented (e.g., when the alternate code is generated or at compile time) to include code that (if selected at runtime, e.g., through the evaluation of one or more branch conditions) causes the critical section to be executed as an atomic transaction, as described above.

In some embodiments, if it is determined (at runtime) that the critical section is likely to be successfully executed as an atomic transaction, shown as the positive exit from 520, the method may include beginning execution of the critical section as an atomic transaction, and the alternate code sequence within the companion code, as in 530. For example, this determination may be dependent on collected statistics about the past performance of these techniques in the application (e.g., by call-site), as described above. In different embodiments, an attempt may be made to execute the critical section of code using a best-effort hardware transactional memory implementation or using a software transactional memory implementation. In some embodiments, if the transaction attempt does not succeed, shown as the negative exit from 540, it may be retried. For example, in some embodiments, a transaction may be retried one or more times until a predetermined maximum number of attempts have been made. This is illustrated in FIG. 5 by the feedback from the negative exit of 545 to 530. In some embodiments, if the transaction fails when attempted using a best-effort hardware transactional memory, it may be retried using a software transactional memory. If the transaction succeeds, shown as the positive exit from 540, execution of the application may continue, as in 560.

In some embodiments, if it is determined (at runtime) that the critical section is not likely to be successfully executed as an atomic transaction, shown as the negative exit from 520, the method may include causing the critical section to be executed non-transactionally (e.g., by branching to the code for the critical section in its original form), and executing the prologue/epilogue and/or bookkeeping/recovery code within the companion code (as in 550) before continuing execution of the application (as in 560). As in previous examples, if a maximum number of transaction attempts have been made, but none were successful (shown as the positive exit from 545), the method may include detecting that the transaction failed and resorting to executing the prologue, critical section, and epilogue as in the original GetLatch and FreeLatch 1 routines and/or generating an error indication (e.g., an indication that execution of the critical section as an atomic transaction failed), as in 555, before continuing execution of the application, as in 560.

While the optimization techniques described herein have been illustrated in several examples in the context of optimizing latches in a database system, they may be broadly applicable. For example, any time a first section of code can be identified that is executed only because a second section of code may experience interference from other threads or processes, the first code may be eliminated or optimized by ensuring that the second executes atomically. As described herein, one way to do so is by using a hardware transaction. To demonstrate that these techniques may be applied more broadly, i.e. in contexts other than those involving database latches, several other scenarios in which they may be applied are described below.

Another context in which the optimization techniques described herein may be applied (in other embodiments) may involve mutexes, such as POSIX compliant robust mutexes. These mutexes, created using pthread_mutexattr_setrobust_np( ) may allow recovery if the owner of such a mutex dies. If any threads were blocked on the mutex when the owner died, one will be picked to claim the lock and will receive a return value of EOWNERDEAD, indicating that some cleanup may be needed. Otherwise, if there were no blocked threads, the next thread to try to acquire the lock will take the lock and receive a return value of EOWNERDEAD. As with the database latches described above, in some embodiments, infrastructure code used to facilitate this functionality may be elided by using an atomic transaction to execute the critical section, thus eliminating the possibility of its partial execution. In addition, there may be no need to wake threads to recover the orphan lock, because threads in transactions will never die while holding the lock.

Reference counts (e.g., as used to support garbage collection in various programming languages), may provide another example of metadata that is, at least in some cases, maintained largely to defend against possible concurrent interactions, and to which the optimization techniques described herein may be applied. For example, if it were known that there was no chance for an object to be reclaimed while a given section of code is accessing it (e.g., to reclaim the object within the same critical section in which it is accessed), there would be no need to increment and subsequently decrement its reference count within that section of code, as the net effect would be as if it were not modified at all. Therefore, in some embodiments, if a code section is identified that includes an increment and a subsequent decrement of the reference count for an object, and this code can be executed in a hardware transaction, then the reference count need not be modified. In such embodiments, the increment and subsequent decrement of the reference count may be elided if the critical section is forced to execute as an atomic transaction. Depending on the latency and probability of success of the hardware transactions, this may improve performance. Furthermore, this technique may help to mitigate performance bottlenecks arising from contention on reference counts. For example, the reference count of an object that is read frequently by many threads may cause a bottleneck due to the need for each thread to modify it. Eliminating some or all of the updates to the reference count may reduce such contention and may also reduce memory coherence traffic.

Figure 6:
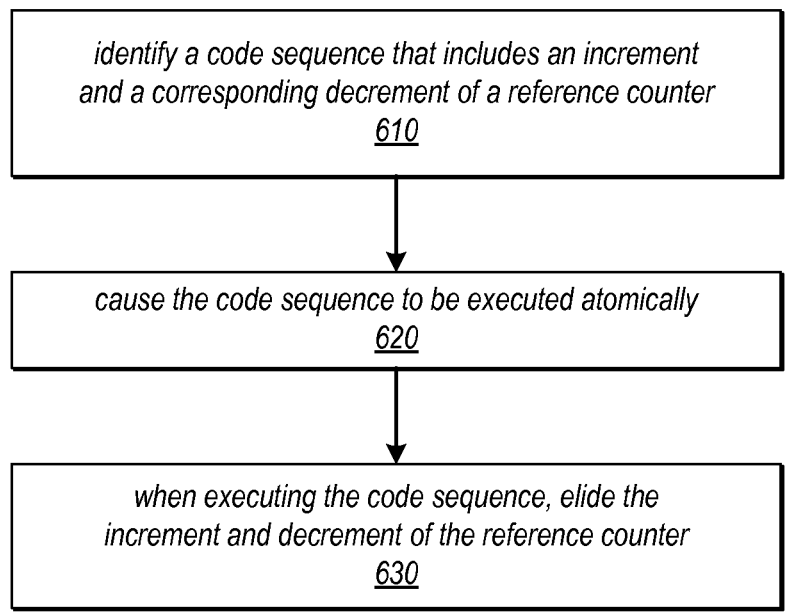
FIG. 6 is a flow diagram illustrating a method for using an atomic transaction to optimize the use of a reference count, according to one embodiment.

One embodiment of a method for using an atomic transaction to optimize the use of a reference count for a shared object is illustrated by the flow diagram in FIG. 6. In this example, a code sequence that includes an increment and a corresponding decrement of a reference count may be identified, as in 610. For example, such a code sequence may be identified by the programmer or by a compiler using static analysis, in some embodiments. In response to identifying the code sequence, the method may include forcing the code sequence to be executed atomically, as in 620. A variety of mechanisms may be employed to cause the code sequence to be executed atomically (including those described herein), in different embodiments. For example, in various embodiments instructions or language-level constructs may be inserted to bracket the code sequence and denote it as a code sequence to be executed as an atomic transaction; calls to functions of a transaction support library to initiate, validate, and/or commit a hardware or software transaction that implements the operations within the code sequence (such as the chkpt and commit instructions described herein) may be inserted; loads and stores within the code sequence may be replaced with transactional loads and stores; and/or the source code may be otherwise instrumented in a way that would force the code sequence to be executed as an atomic transaction.

As illustrated in this example, when executing the code sequence, the increment and corresponding decrement of the reference count may be elided, as in 630. For example, in various embodiments, the programmer or compiler may remove them from the code in response to identifying them, or may generate and insert an alternate sequence (from which they are omitted) that may be selected for execution at runtime, e.g., through the evaluation of one or more branch conditions. Note that the techniques described above for optimizing the use of a reference count are applicable to code sequences in which an increment of the reference count is followed by a decrement of the reference count, a decrement of the reference count is followed by an increment of the reference count, or any equal number of increments and decrements of the reference count are performed within the code sequence in any order (i.e. as long as there is no net change in the reference count due to the execution of the code sequence in its entirety). Note also that in some embodiments, executing the code sequence may include committing the atomic transaction (if it succeeds), retrying it (if it fails), or resorting to execution of the code sequence in its original form, (e.g., if the transaction fails a pre-determined maximum number of times).

Note that, as in previous examples, in some embodiments, a compiler may first generate executable code from the source code (in its original form) and then may invoke or call an optimizer function, sub-module, or standalone module, which may be configured to insert code that is executable to force the code sequence to be executed atomically, and to generate alternate code sequences and/or modify existing code sequences in the compiled code to elide the increment and subsequent decrement of the reference count. In general, any or all of the functionally illustrated in FIG. 6 and/or described herein as being performed by a compiler may be performed by a compiler, a code optimizer, an assembler, a just-in-time (JIT) compiler, a dynamic compiler, or any other entity suitable for performing the described functionality. In other embodiments, any or all of the functionally illustrated in FIG. 6 and/or described herein as being performed by a compiler may be performed by the programmer using one or more profiling, debugging, code editing, and/or optimization tools of a software development environment to assist the programmer in analyzing the source code of an application, identifying any companion code within the application (e.g., code to increment and subsequently decrement a reference counter), and/or generating modified code for the application, as described herein.

Another context in which the optimization techniques described herein may be applied is in the use of concurrent data structures. For example, the code for such data structures often includes intricate synchronization mechanisms to defend against the possibility of interference from concurrent threads. In some embodiments, by forcing code that accesses these data structures to be executed as an atomic transaction, these synchronization mechanisms may be optimized (e.g., simplified or eliminated).

Figure 7:
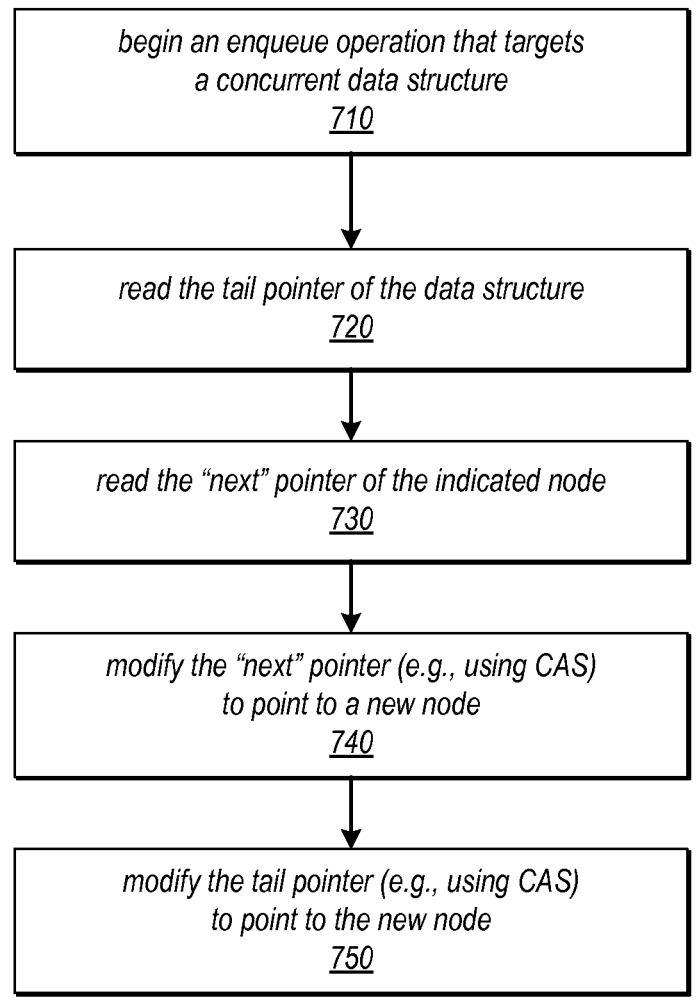
FIGS. 7-8 are flow diagrams illustrating the optimization of an enqueue operation for a concurrent data structure, according to one embodiment.
Figure 8:
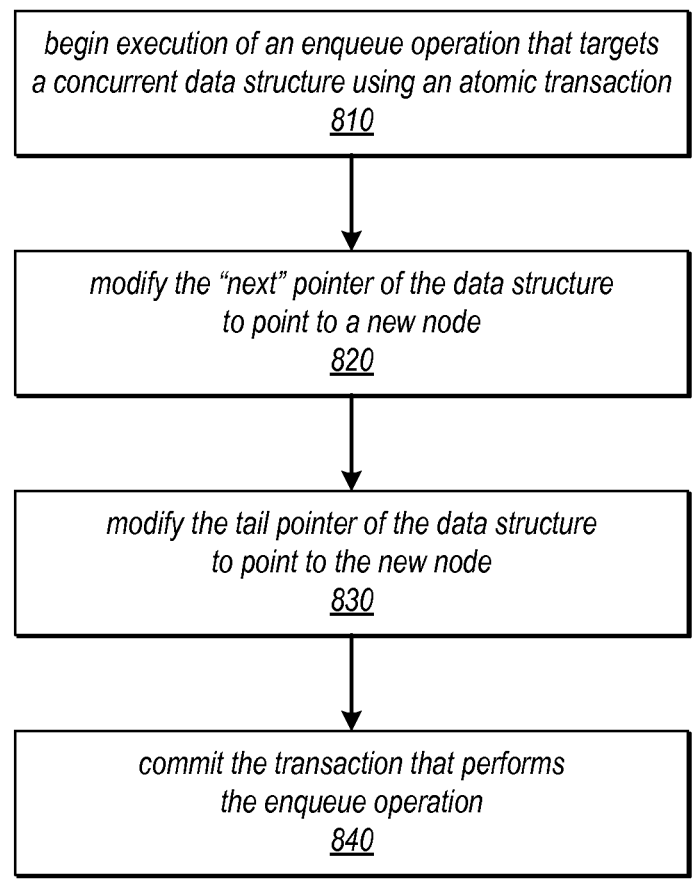

One example of the type of operations on concurrent data structures that may be optimized using the techniques described herein is illustrated by the flow diagrams in FIGS. 7 and 8, according to one embodiment. Specifically, these figures illustrate the optimization of an enqueue operation for a concurrent data structure, according to one embodiment. In this example, in response to beginning an enqueue operation that targets a FIFO queue, shown as 710 in FIG. 7, the method may include:

1. Reading the tail pointer of the data structure (as in 720)
2. Reading the "next" pointer of the indicated node (as in 730)
3. Modifying the "next" pointer to point to a new node, using a compare-and-swap (CAS) type operation, for example (as in 740) and
4. Modifying the tail pointer to point to the new node, using a CAS type operation, for example (as in 750).

In this example, if the two CAS type operations are successful, execution may continue following this enqueue operation. Otherwise, the enqueue operation may need to be retried, or another recovery mechanism may need to be applied. In this example, the need for two CAS type operations and the need to update the tail pointer after installing the new node both arise from the possibility of interference from concurrently executed code. In some embodiments, these operations may be eliminated (e.g., by the programmer or by a compiler) if the enqueue operation is forced to execute in an atomic transaction, e.g., as described herein. In some embodiments, code that is executable to perform the operations illustrated in FIG. 7 may be generated by a compiler, and then the compiled code may be optimized to force the enqueue operation to be performed in an atomic transaction, and to elide operations that are (consequently) unnecessary in the compiled code. In other embodiments, any or all of the functionally illustrated in FIG. 7 may be performed by the programmer using one or more profiling, debugging, code editing, and/or optimization tools of a software development environment.

FIG. 8 illustrates the result of the application of the techniques described herein to operations targeting a concurrent data structure (e.g., such as an enqueue operation targeting the FIFO queue described in the example above). As illustrated in FIG. 8, execution of an enqueue operation that targets such a concurrent data structure may be initiated using an atomic transaction (as in 810), and in response, the following operations may be performed within that atomic transaction:

1. Modifying the "next" pointer of the data structure to point to a new node, as in 820 (e.g., using a standard write operation, rather than an expensive CAS type operation)
2. Modifying the tail pointer of the data structure to point to the new node, as in 830 (again, using a standard write operation, rather than an expensive CAS type operation) and
3. Committing the transaction that performs the enqueue operation, as in 840.

Note that, as in previous examples, committing the transaction may in some embodiments and in some cases involve multiple transaction attempts, but there may be no possibility of partial execution or an incorrect result of the enqueue operation due to interference. However, unlike in previous examples (in which separate prologue/epilogue or bookkeeping/recovery code sections are optimized by causing a different section of code to execute atomically), in this application of the optimization techniques, the code section being executed atomically and the code section being optimized are the same code section. These techniques may be similarly applicable to many other concurrent data structures and code that accesses them, in different embodiments.

Figure 9:
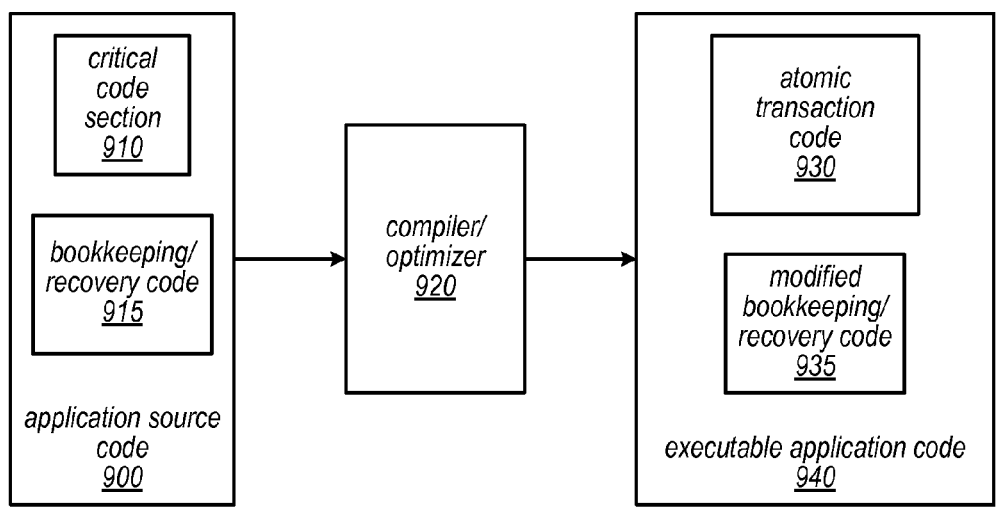
FIG. 9 is a block diagram illustrating the compilation of application source code into executable application code, according to various embodiments.

FIG. 9 is a block diagram illustrating the compilation of application source code into executable application code, according to various embodiments. More specifically, FIG. 9 illustrates an example in which a compiler/optimizer 920 is used to analyze application source code 900 (which may include a critical code section 910 and associated bookkeeping/recovery code 915), and to generate atomic transaction code 930 and modified bookkeeping/recovery code 935 as part of executable application code 940, according to one embodiment. In some embodiments, compiler/optimizer 920 may be configured to replace programmer written code (such as in critical code section 910), with alternate code that is to be executed atomically (such as atomic transaction code 930), as described herein. In other embodiments compiler/optimizer 920 may generate alternate code for forcing critical code section 910 to be executed atomically that may be conditionally selected for execution at runtime, as described herein.

In some embodiments, compiler/optimizer 920 may be configured to replace bookkeeping/recovery code 915 (which may include a prologue, an epilogue, bookkeeping code, or recovery code that would only need to be executed if there exists the possibility that the critical code section 910 could be partially executed) with modified bookkeeping/recovery code 935 (which may omit at least some of the prologue, epilogue, bookkeeping code, or recovery code that would only need to be executed if there exists the possibility that the critical code section 910 could be partially executed). In other embodiments compiler/optimizer 920 may generate alternate code that elides some or all of a prologue, an epilogue, bookkeeping code, or recovery code, and that may be conditionally selected for execution at runtime, as described herein.

For example, a programmer may write the source code for an application, such as application source code 900, and that source code may include (e.g., in bookkeeping/recovery code 915) operations related to the acquisition and/or release of latches or locks that protect critical code section 910, or operations targeting reference counters or other shared data structures (as described herein). Compiler/optimizer 920 may be configured to identify sequences of instructions or other fragments or portions of an application (e.g., functions, objects, method, classes, etc.) that would only need to be executed if there exists the possibility that the critical code section 910 could be partially executed. In response, compiler/optimizer 920 may be configured to generate code (within executable application code 940) to ensure that critical code section 910 is executed atomically, and code that may be used to elide (statically or dynamically) any or all instructions within bookkeeping/recovery code 915 that would only need to be executed if there exists the possibility that the critical code section 910 could be partially executed. In various embodiments, compiler/optimizer 920 may apply various instrumentation techniques and/or optimizations to force critical code section 910 to be executed as an atomic transaction and to elide unnecessary portions of bookkeeping/recovery code 915 in a single pass (or using a single, multi-function software module) to produce the compiled application code. In other embodiments, compiler/optimizer 920 may include one software module for compiling application source code 900, and a separate software module for optimizing the resulting compiled code to force critical code section 910 to be executed as an atomic transaction and to elide unnecessary portions of bookkeeping/recovery code 915.

While described herein in terms of a compiler, compiler/optimizer 920 may represent other entities configured to generate executable application code 940, according to different embodiments. For example, in various embodiments, compiler/optimizer 920 may represent a compiler, a code optimizer, an assembler, a just-in-time (JIT) compiler, or a dynamic compiler. In general, compiler/optimizer 920 may represent any entity capable of and configured to generate executable application code 940 (including atomic transaction code 930 and modified bookkeeping/recovery code 935), as described herein. While described herein as various software entities, compiler/optimizer 920 may, in some embodiments, represent a hardware-based entity configured to generate executable application code 940. Note that in other embodiments, some or all of the functions described above as being performed by a compiler or compiler/optimizer, or by software generated on the basis of a compiler analysis, may instead be performed in hardware. In such embodiments, there may be no need for a compiler to produce code that explicitly causes these functions to be performed. In still other embodiments, any or all of the functionality described herein as being performed by a compiler (such as compiler/optimizer 920) may be performed by the programmer using one or more profiling, debugging, code editing, and/or optimization tools of a software development environment to assist the programmer in analyzing the source code of an application, identifying any companion code within the application, and/or generating modified code for the application, as described herein.

Application source code 900, critical code section 910, and/or bookkeeping/recovery code 915 may represent program instructions in any of various languages, according to various embodiments. For example, in some embodiments, application source code 900 (and/or any of its sub-modules) may represent code written in a high level programming language, such as C, C++, or Java™. In other embodiments, application source code 900 (and/or any of its sub-modules) may represent binary instructions or assembly instructions. In yet other embodiments, application source code 900 (and/or any of its sub-modules) may also represent compiler-intermediate instructions or virtual machine byte code instructions, such as Java™ byte code instructions.

In some embodiments, atomic transaction code 930 may be configured to utilize and/or include one or more libraries of transaction enabling code, such as a transaction support library (not shown). In various embodiments, atomic transaction code 930 and/or a transaction support library may include functionality to execute transactions according to various hardware transactional memory techniques or software transactional memory techniques. For example, in some embodiments, atomic transaction code 930 may include the functionality to begin and end transactions according to various hardware or software transactional memory techniques. In another example, atomic transaction code 930 may make calls into a transaction support library for beginning and committing hardware or software transactions, and/or for performing one or more transactional memory access. Additional functionality, such as the ability to support self-abort and/or nesting in transactions, may be provided by functions of a transaction support library, in some embodiments.

Figure 10:
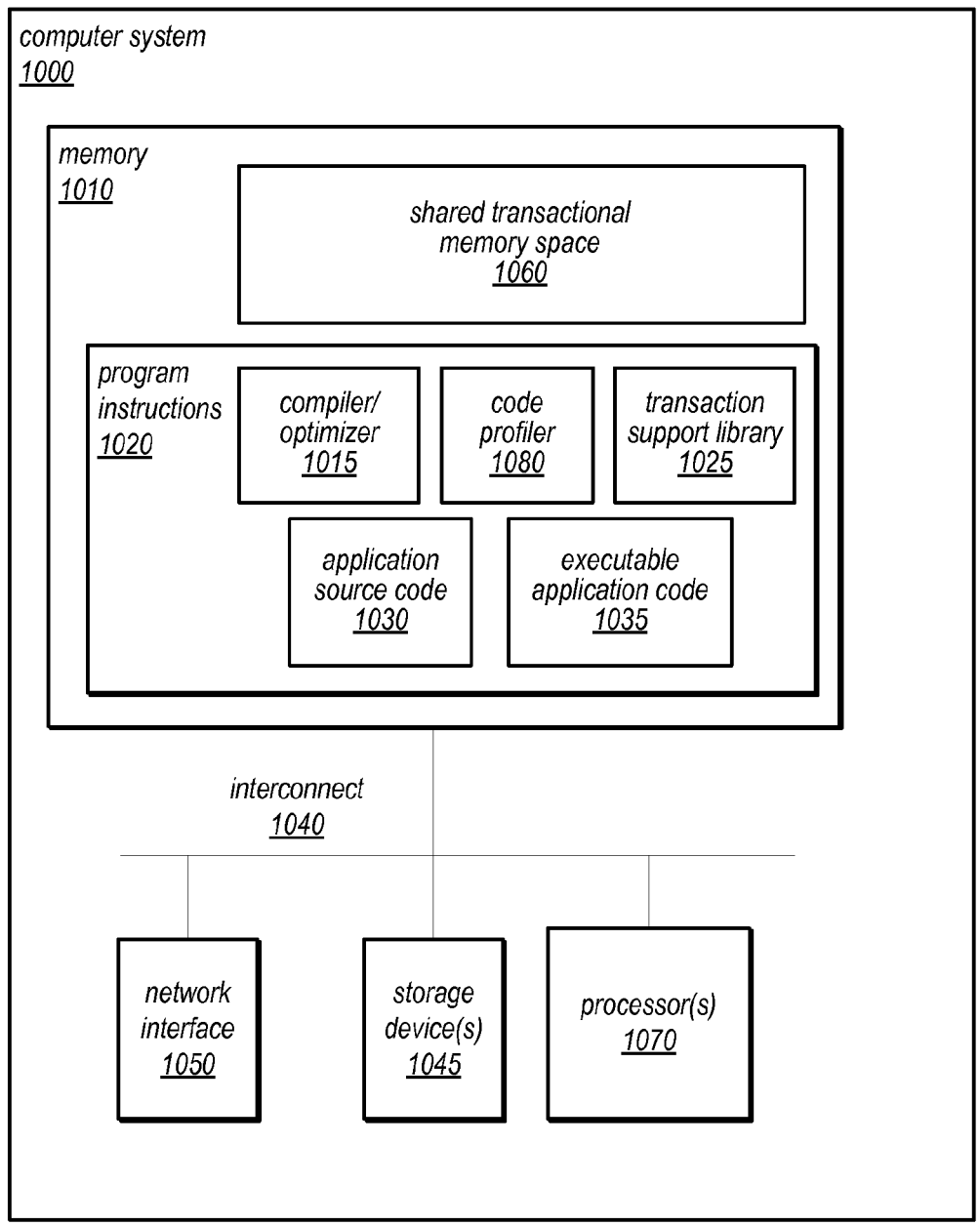
FIG. 10 is a block diagram illustrating one embodiment of a computer system configured to implement a transactional memory and mechanisms for optimizing one code sequence by causing another code sequence to be executed atomically, as described herein.

The techniques described herein for optimizing a code sequence by forcing another code sequence to execute atomically may be implemented in any of a wide variety of computing systems. FIG. 10 illustrates a computing system that is configured to implement a transactional memory and to optimize code sequences by forcing other code sequences to execute atomically, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform the techniques described herein. A computer-readable medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1070 (possibly including multiple processors, a single-threaded processor, a multi-threaded processor, a multi-core processor, etc.). The computer system 1000 may also include one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and one or more storage device(s) 1045 (e.g., optical storage, magnetic storage, etc.). The memory medium may include other types of memory as well, or combinations thereof. In other embodiments, computer system 1000 may include more, fewer, or different components than those illustrated in FIG. 10 (e.g., video cards, audio cards, additional network interfaces, peripheral devices, etc.). The processor unit 1070, the storage device(s) 1045, the network interface 1050, and the system memory 1010 may be coupled to the system interconnect 1040.

One or more of the system memories 1010 may include program instructions 1020 configured to implement a combination compiler/optimizer 1015 (or a compiler and a separate optimizer, as described herein) that is configured to provide executable functional sequences for optimizing code sequences by forcing other code sequences to execute atomically. In some embodiments, program instructions 1020 may also be configured to implement a code profiler 1080, which may provide various methods for analyzing and/or profiling application source code and/or executable code (e.g., to assist the programmer in identifying companion code sequences). Additionally, one or more of the system memories 1010 may include application source code 1030 (including a critical code section that may access a shared resource, a related prologue, a related epilogue, and/or related bookkeeping/recovery code) and/or executable application code 1035, as described herein. In some embodiments, program instructions 1020 may also be configured to implement a transaction support library 1025, which provides various methods for implementing atomic transactions. In some embodiments, alternate code generated by compiler/optimizer 1015 (or by the programmer with the assistance of compiler/optimizer 1015 and/or code profiler 1080) to cause the critical code section to be executed atomically may include calls to transaction support library 1025.

In various embodiments, compiler/optimizer 1015, code profiler 1080, transaction support library 1025, application source code 1030, and/or executable application code 1035 may each be implemented in any of various programming languages or methods. For example, in one embodiment, compiler/optimizer 1015, code profiler 1080, and/or transaction support library 1025 may be JAVA based, while in another embodiments, they may be written using the C or C++ programming languages. Similarly, application source code 1030 may be written using Java, C, C++, or another programming language, according to various embodiments. Moreover, in some embodiments, compiler/optimizer 1015, code profiler 1080, transaction support library 1025, and application source code 1030 may not be implemented using the same programming language. For example, application source code 1030 may be C++ based, while compiler/optimizer 1015 and/or code profiler 1080 may be developed using C.

As illustrated in FIG. 10, memory 1010 may also include a shared transactional memory space 1060, which may support and/or be accessed by transactions in a software transactional memory implementation, a hardware transactional memory implementation, and/or a hardware-software hybrid transactional memory implementation, in different embodiments. In some embodiments, memory 1010 may include one or more shared storage locations that are accessible by two or more transactions executing in computer system 1000. For example, shared resources, latches, and/or other concurrent data structures accessed by a critical section or otherwise employed in the execution of the critical section as an atomic transaction may be maintained within transactional memory space 1060, in some embodiments.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    performing by a computer:
        beginning execution of an application that comprises two alternative execution paths for performing a sequence of operations, wherein the sequence of operations comprises one or more operations that access a shared resource; and
        a thread of the application selecting, at runtime, a given one of the two execution paths;
        wherein one of the two execution paths comprises one or more operations that facilitate detecting that a result of the sequence of operations has been affected by interference from another executing thread, recovering from interference from another executing thread, or recovering from a failure to complete the sequence of operations in its entirety;
        wherein on the one of the two execution paths, the sequence of operations is performed non-transactionally;
        wherein the other one of the two execution paths comprises one or more operations for forcing the sequence of operations to be executed as an atomic transaction; and
        wherein the other one of the two execution paths omits or optimizes the one or more operations for detecting that a result of the sequence of operations has been affected by interference or for recovering from a failure to complete the sequence of operations in its entirety.

2. The method of claim 1, wherein said detecting comprises detecting an inconsistency between a value of the shared resource that is visible to the thread and a value of the shared resource that is visible to the other executing thread.

3. The method of claim 1, wherein said forcing the sequence of operations to be executed as an atomic transaction comprises attempting to execute the sequence of operations using a hardware transactional memory implementation.

4. The method of claim 3, further comprising, in response to a failed attempt to execute the sequence of operations using a hardware transactional memory implementation, selecting the one of the two execution paths in a subsequent attempt to execute the sequence of operations.

5. The method of claim 1, further comprising determining whether attempting to execute the sequence of operations using a hardware transactional memory implementation is likely to be successful;
    wherein said selecting is dependent on said determining.

6. The method of claim 1, wherein the one or more operations of the one of the two execution paths comprise:
    a prologue to be executed prior to executing the sequence of operations, wherein the prologue performs bookkeeping associated with accesses to the shared resource; or
    an epilogue to be executed subsequent to executing the sequence of operations, wherein the epilogue performs operations to update at least some of the bookkeeping associated with accesses to the shared resource, or performs detecting or recovering from interference with the accesses to the shared resource by another thread whose execution is interleaved with the execution of the sequence of operations.

7. The method of claim 1, wherein said forcing the sequence of instructions to be executed as an atomic transaction comprises executing the sequence of instructions using a software transactional memory implementation.

8. The method of claim 7, wherein executing the sequence of instructions using a software transactional memory implementation is performed in response to one or more failed attempts to execute the sequence of instructions using a hardware transactional memory implementation.

9. A non-transitory, computer-readable storage medium, storing program instructions that when executed on one or more computers cause the one or more computers to perform:
    beginning execution of an application that comprises two alternative execution paths for performing a sequence of operations, wherein the sequence of operations comprises one or more operations that access a shared resource; and
    a thread of the application selecting, at runtime, a given one of the two execution paths;
    wherein one of the two execution paths comprises one or more operations that facilitate detecting that a result of the sequence of operations has been affected by interference from another executing thread, recovering from interference from another executing thread, or recovering from a failure to complete the sequence of operations in its entirety;
    wherein on the one of the two execution paths, the sequence of operations is performed non-transactionally;

wherein the other one of the two execution paths comprises one or more operations for forcing the sequence of operations to be executed as an atomic transaction; and wherein the other one of the two execution paths omits or optimizes the one or more operations for detecting that a result of the sequence of operations has been affected by interference or for recovering from a failure to complete the sequence of operations in its entirety.

10. The storage medium of claim 9, wherein said forcing the sequence of operations to be executed as an atomic transaction comprises attempting to execute the sequence of operations using a hardware transactional memory implementation.

11. The storage medium of claim 10, wherein when executed on the one or more computers, the program instructions further cause the one or more computers to perform, in response to a failed attempt to execute the sequence of operations using a hardware transactional memory implementation, selecting the one of the two execution paths in a subsequent attempt to execute the sequence of operations.

12. The storage medium of claim 9, wherein when executed on the one or more computers, the program instructions further cause the one or more computers to perform determining whether attempting to execute the sequence of operations using a hardware transactional memory implementation is likely to be successful;

wherein said selecting is dependent on said determining.

13. The storage medium of claim 9, wherein the one or more operations of the one of the two execution paths comprise:

a prologue to be executed prior to executing the sequence of operations, wherein the prologue performs bookkeeping associated with accesses to the shared resource; or an epilogue to be executed subsequent to executing the sequence of operations, wherein the epilogue performs operations to update at least some of the bookkeeping associated with accesses to the shared resource, or performs detecting or recovering from interference with the accesses to the shared resource by another sequence of operations whose execution is interleaved with the execution of the sequence of operations.

14. A method, comprising:

using a computer to perform:

analyzing source code comprising a plurality of instructions;

identifying, based on said analyzing, a sequence of instructions within the plurality of instructions that when executed performs one or more operations that facilitate detecting that a result of another sequence of instructions within the plurality of instructions that comprises one or more access operations targeting a shared resource has been affected by interference from another executing thread, recovering from interference from another executing thread, or recovering from a failure to complete the other sequence of instructions in its entirety; and in response to said identifying, generating alternate code that omits or optimizes at least a portion of the identified sequence of instructions;

wherein the identified sequence of instructions comprises instructions that are executable to cause the other sequence of instructions to be executed non-transactionally;

wherein the alternate code comprises an alternate sequence of instructions for performing operations specified by at least a portion of the source code;

wherein the alternate code is executable to implement forcing the other sequence of instructions to be executed as an atomic transaction.

15. The method of claim 14, wherein facilitating detecting that a result of the other sequence of instructions has been affected by interference from another executing thread, recovering from interference from another executing thread, or recovering from a failure to complete the other sequence of instructions in its entirety comprises recording information usable to identify a thread or process that will perform the other sequence of instructions.

16. The method of claim 14, further comprising determining, at runtime, whether the alternate code or the at least a portion of the source code should be executed.

17. The method of claim 14, wherein said forcing the other sequence of instructions to be executed as an atomic transaction comprises attempting to execute the other sequence of instructions using a hardware transactional memory implementation.

18. The method of claim 14, wherein the identified sequence of instructions is a sequence of instructions within the other sequence of instructions.

19. The method of claim 14, wherein the identified sequence of instructions comprises:

a prologue to be executed prior to executing the sequence of operations, wherein the prologue performs bookkeeping associated with accesses to the shared resource; or an epilogue to be executed subsequent to executing the sequence of operations, wherein the epilogue performs operations to update at least some of the bookkeeping associated with accesses to the shared resource, or performs detecting or recovering from interference with the accesses to the shared resource by a third sequence of instructions whose execution is interleaved with the execution of the other sequence of operations.

20. The method of claim 14, wherein at least one of said analyzing, said identifying, or said generating is performed by a compiler, a code profiler, a code optimizer, an assembler, a just-in-time (JIT) compiler, or a dynamic compiler.

* * * * *

UNITED STATES PATENT AND TRADEMARK OFFICE
CERTIFICATE OF CORRECTION

PATENT NO.         : 8,533,699 B2                                    Page 1 of 1
APPLICATION NO.    : 13/077793
DATED              : September 10, 2013
INVENTOR(S)        : Moir et al.

It is certified that error appears in the above-identified patent and that said Letters Patent is hereby corrected as shown below:

Title Page, Item (75) Inventors, line 1, delete "Wllington" and insert -- Wellington --, therefor.

In the Drawings

On sheet 4 of 10, in figure 4, reference numeral 410, line 2-3, delete "from a to failure successfully" and insert -- from a failure to successfully --, therefor.

In the Specification

In column 11, line 42, delete "GetLatch conservative and FreeLatch conservative)" and insert -- GetLatch_conservative and FreeLatch_conservative) --, therefor.

In column 14, line 56, delete "np( )" and insert -- np( ), --, therefor.

Signed and Sealed this
Thirty-first Day of December, 2013

Margaret A. Focarino
*Commissioner for Patents of the United States Patent and Trademark Office*